US009739248B2

(12) United States Patent
Dudar et al.

(10) Patent No.: US 9,739,248 B2
(45) Date of Patent: Aug. 22, 2017

(54) FUEL SYSTEM LEAK DETECTION USING PASSIVE VALVES

(71) Applicant: Ford Global Technologies, LLC, Dearborn, MI (US)

(72) Inventors: Aed M. Dudar, Canton, MI (US); Robert Roy Jentz, Westland, MI (US); Mark W. Peters, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 13/841,414

(22) Filed: Mar. 15, 2013

(65) Prior Publication Data

US 2014/0260549 A1 Sep. 18, 2014

(51) Int. Cl.
*G01M 3/04* (2006.01)
*F02M 65/00* (2006.01)

(52) U.S. Cl.
CPC ................................ *F02M 65/006* (2013.01)

(58) Field of Classification Search
CPC F02M 65/006; G01M 3/3245; G01M 3/3236; G01M 3/32; G01M 3/329; G01M 3/36; G01M 3/363; G01M 3/04
USPC .......................................... 73/40, 49.2, 49.3
See application file for complete search history.

(56) References Cited

U.S. PATENT DOCUMENTS

| | | | | |
|---|---|---|---|---|
| 6,276,344 | B1 * | 8/2001 | Isobe et al. | 123/520 |
| 7,086,392 | B2 | 8/2006 | Suzuki | |
| 2009/0211340 | A1 | 8/2009 | Wang et al. | |
| 2010/0275888 | A1 * | 11/2010 | Yuen et al. | 123/520 |
| 2011/0084073 | A1 * | 4/2011 | Whelan | F02M 37/0076 220/288 |
| 2011/0139130 | A1 | 6/2011 | Siddiqui | |
| 2011/0153232 | A1 * | 6/2011 | Ito | G01M 3/002 702/51 |
| 2011/0215936 | A1 * | 9/2011 | Ansari | G01M 3/002 340/584 |
| 2012/0085325 | A1 * | 4/2012 | Makino et al. | 123/521 |
| 2012/0160220 | A1 * | 6/2012 | Hagen | 123/520 |
| 2012/0215399 | A1 | 8/2012 | Jentz et al. | |
| 2014/0095049 | A1 * | 4/2014 | Jentz | F02M 25/0818 701/101 |

* cited by examiner

*Primary Examiner* — John Fitzgerald
*Assistant Examiner* — Truong D Phan
(74) *Attorney, Agent, or Firm* — James Dottavio; McCoy Russell LLP

(57) ABSTRACT

Methods and systems for fuel system leak detection using passive canister vent valves are disclosed. In one example approach, a method comprises generating engine off vacuum or pressure in a fuel system for leak diagnostics, where the pressure and vacuum are held via first and second mechanical relief valves positioned in parallel with one another and without a valve holding current.

17 Claims, 5 Drawing Sheets

FUEL SYSTEM LEAK DETECTION USING PASSIVE VALVES

BACKGROUND/SUMMARY

A vehicle with an engine may include an evaporative emission control system coupled to a fuel system in order to reduce fuel vapor emissions. For example, an evaporative emission control system may include a fuel vapor canister coupled to a fuel tank which includes a fuel vapor adsorbent for capturing fuel vapors from the fuel tank while providing ventilation of the fuel tank to the atmosphere.

Leak testing may be periodically performed on such evaporative emission control systems in order to identify leaks in the system so that maintenance may be performed and mitigating actions may be taken in order to reduce emissions. In some examples, natural vacuum approaches may be used to perform leak detection in evaporative emissions systems in vehicles, e.g., in hybrid electric vehicles. Such approaches may use current-drawing devices, e.g., electro-mechanical valves, in order to seal off the fuel system in order to perform leak diagnostics.

The inventors herein have recognized that in approaches which use current-drawing devices to seal the evaporative system, the power consumption associated with actuating the current-drawing devices to seal the evaporative system may be disadvantageous. For example, such current-drawing devices may draw a significant amount of current to seal off and maintain sealed the evaporative system during leak testing. This power consumption may reduce the time the test can execute during engine off conditions, e.g., after a key off event. Further, this energy draw may reduce how long the evaporative test can execute during engine off conditions in applications where battery power is limited, e.g., in hybrid electric applications. Furthermore, in engine application with limited engine run time, e.g., in hybrid electric vehicles, sufficient natural vacuum may not be available for leak testing while the engine is running.

In one example approach, in order to at least partially address these issues, a method for a vehicle with an engine comprises generating engine off vacuum or pressure in a fuel system for leak diagnostics, where the pressure and vacuum are held via first and second mechanical relief valves positioned in parallel with one another and without a valve holding current.

In this way, passive valves may be used to seal the evaporative system during engine off conditions without utilizing current-drawing devices and the naturally occurring diurnal temperature cycle may be used to generate engine off vacuum or pressure in the fuel system for leak diagnostics. Further, by using passive valves, an engine controller can stay alive for hours or even may wake up later to perform leak analysis since power is not consumed by the passive valves. Such an approach may provide greater flexibility and reduce costs associated with leak testing in an evaporative emission control system especially in hybrid electric systems where active vacuum pumps are used.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
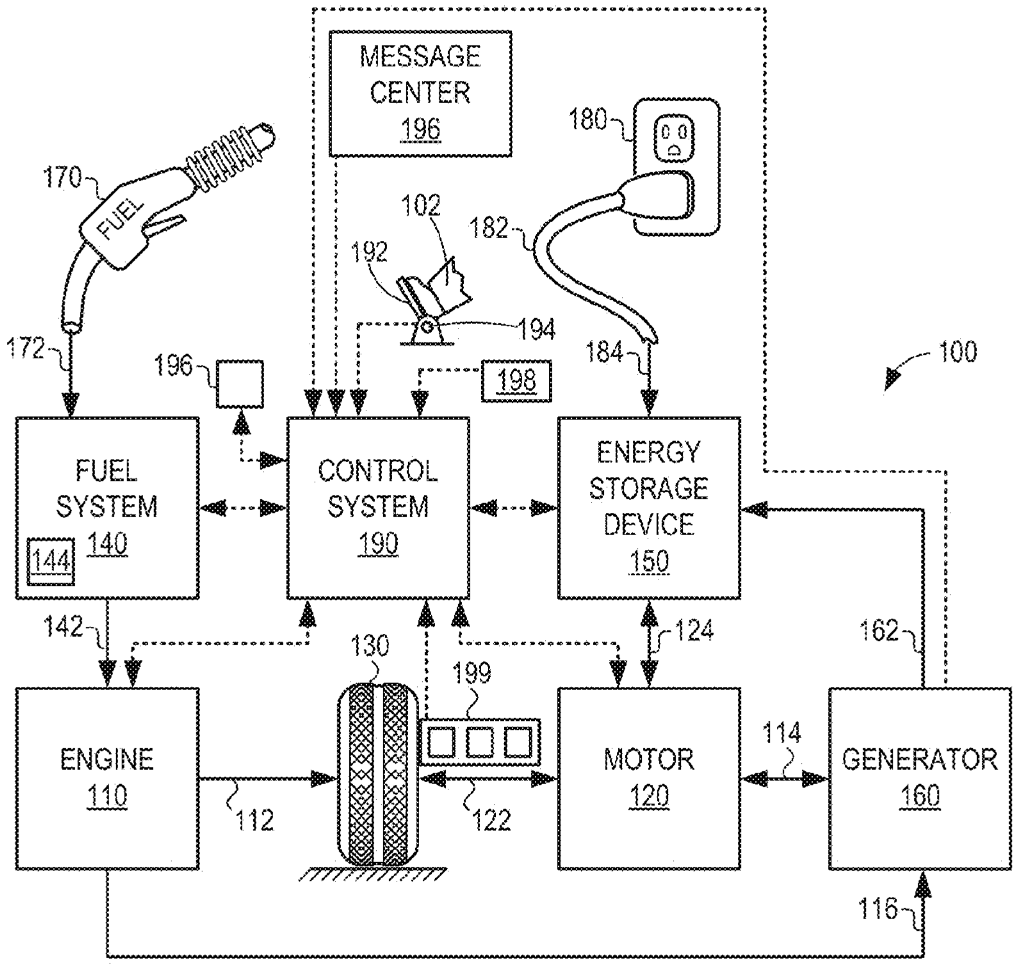
FIG. 1 shows an example vehicle propulsion system.
Figure 2:
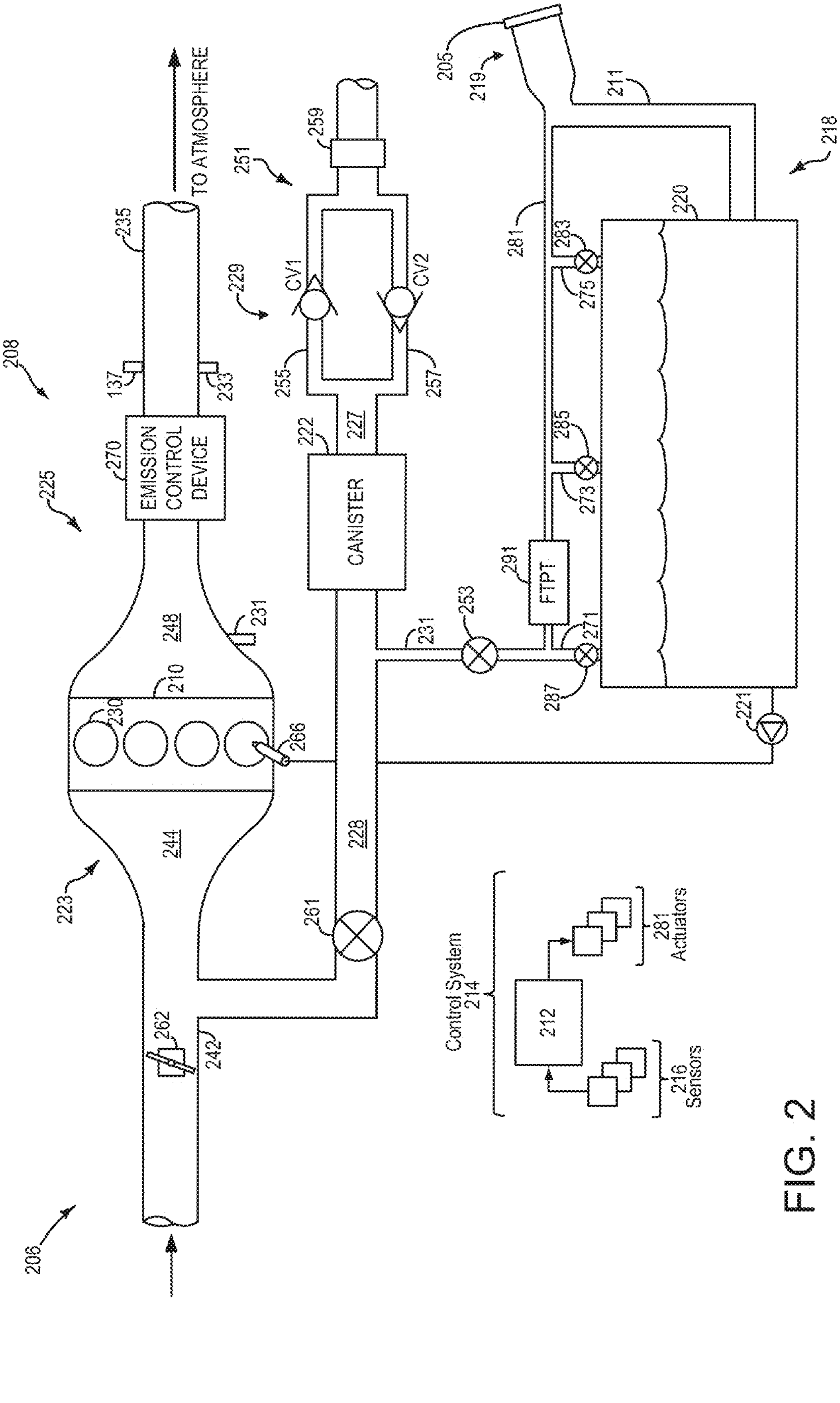
FIG. 2 shows an example vehicle system with a fuel emission control system.
Figure 3:
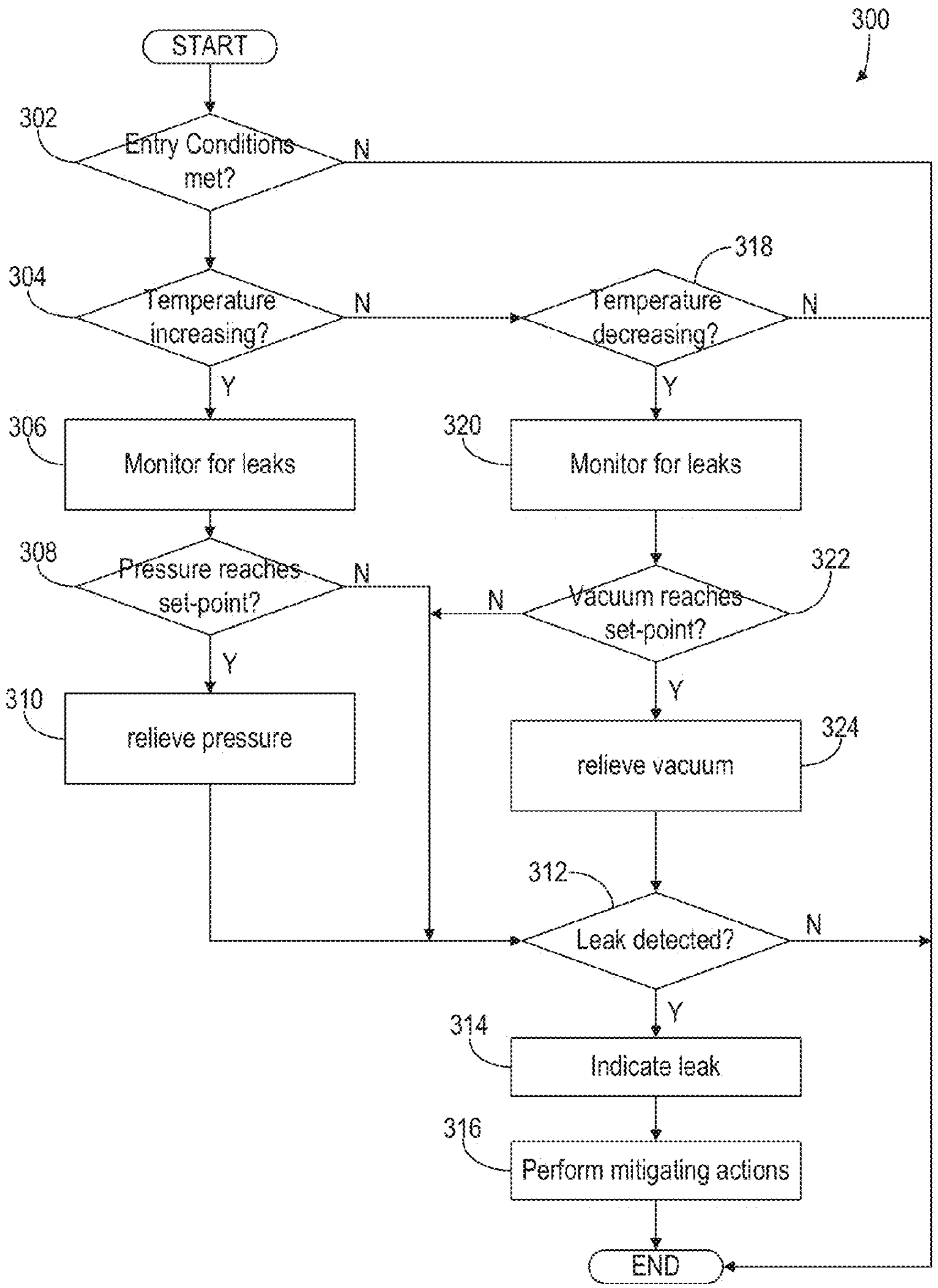
FIG. 3 shows an example method for operating a vehicle with an engine in accordance with the disclosure.
Figure 4:
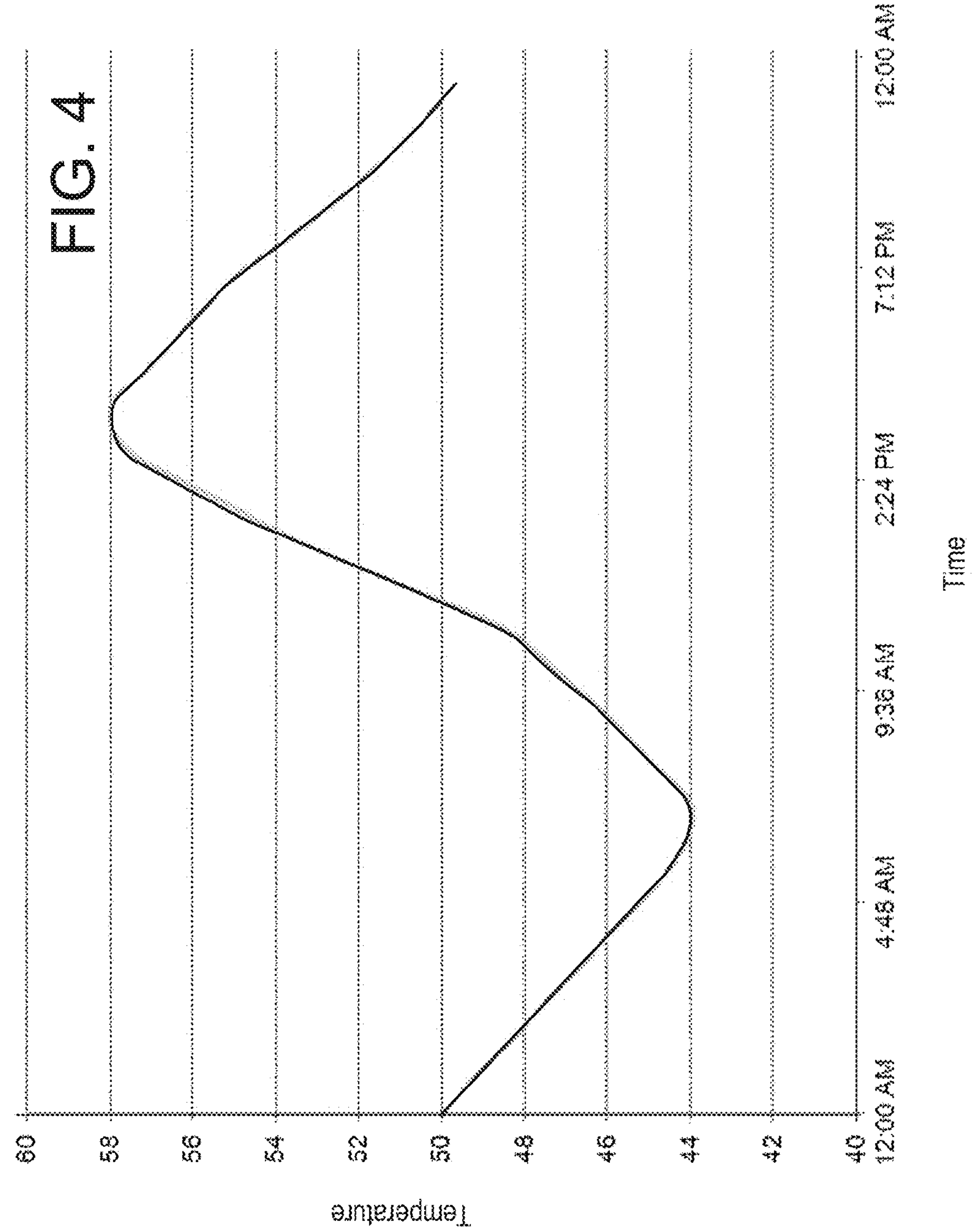
FIG. 4 shows an example diurnal cycle.
Figure 5:
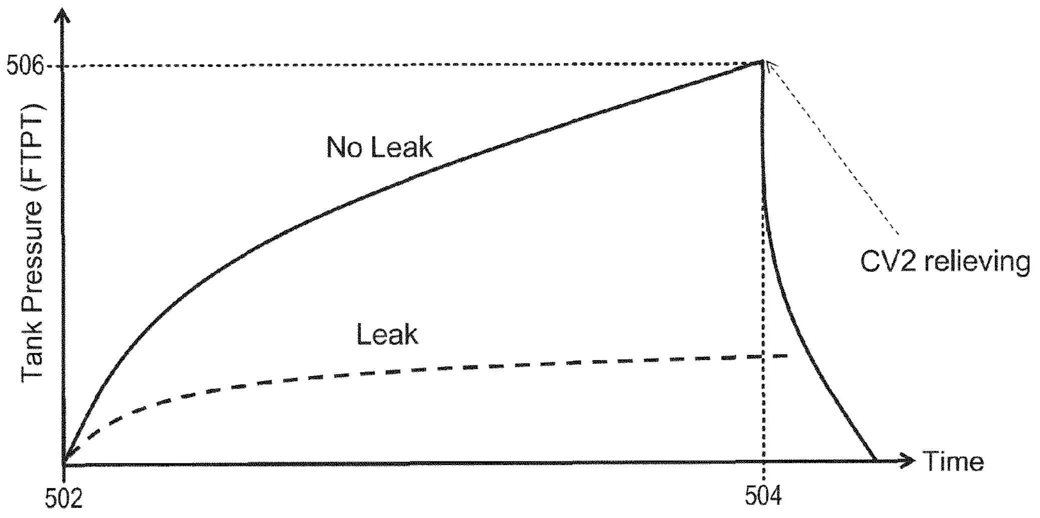
FIG. 5 illustrates leak testing during increasing ambient temperature in accordance with the disclosure.
Figure 6:
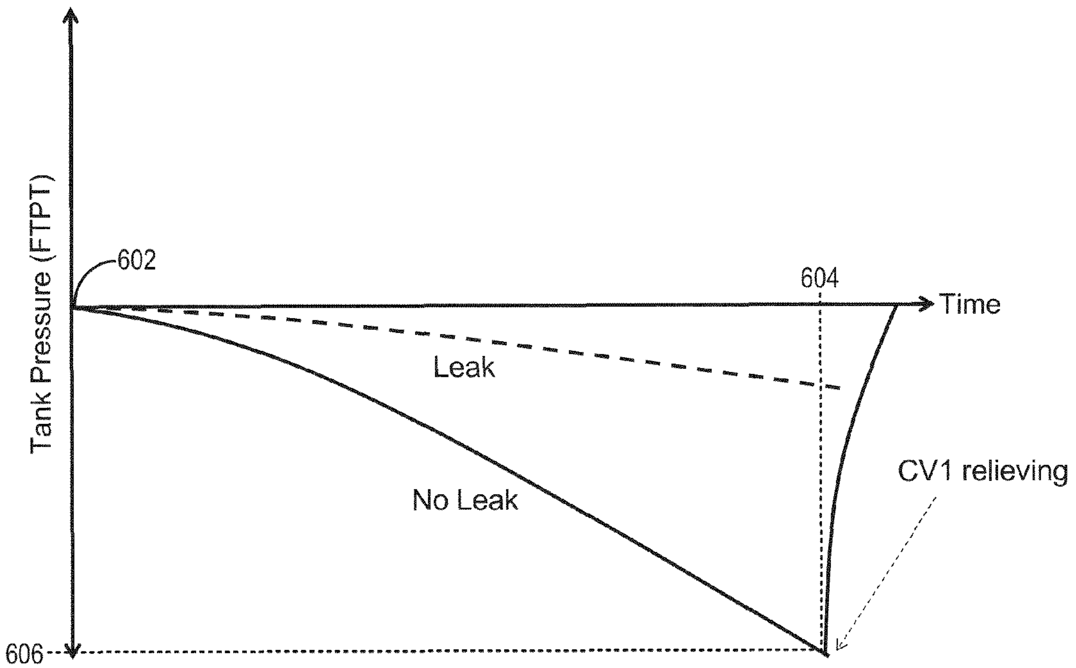
FIG. 6 illustrates leak testing during decreasing ambient temperature in accordance with the disclosure.

The following description relates to systems and methods for generating engine off vacuum or pressure in a fuel system for leak diagnostics in a fuel system of a vehicle, such as the example vehicles shown in FIGS. 1 and 2. As shown in FIG. 3, pressure and vacuum generated in a fuel system of a vehicle may be held via first and second mechanical relief valves positioned in parallel with one another and without a valve holding current during increasing or decreasing ambient temperature conditions which occur during diurnal temperature cycles, such as shown in FIG. 4. For example, the vacuum or pressure may be maintained and the system sealed without applying a current to any valve coupled to the component(s) holding the pressure or vacuum. Leaks may be indicated based on pressure or vacuum changes in the fuel system as illustrated in FIGS. 5 and 6.

Turning now to the figures, FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flows of FIGS. 3 and 4, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp indicated at 196.

The vehicle propulsion system 100 may also include a message center 196, ambient temperature/humidity sensor 198, and a roll stability control sensor, such as a lateral and/or longitudinal and/or yaw rate sensor(s) 199. The message center may include indicator light(s) and/or a text-based display in which messages are displayed to an operator. The message center may also include various input portions for receiving an operator input, such as buttons, touch screens, voice input/recognition, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 shows a schematic depiction of a vehicle system 206. The vehicle system 206 includes an engine system 208 coupled to an emissions control system 251 and a fuel system 218. Emission control system 251 includes a fuel vapor canister 222 which may be used to capture and store fuel vapors. In some examples, vehicle system 206 may be a hybrid electric vehicle system.

The engine system 208 may include an engine 210 having a plurality of cylinders 230. The engine 210 includes an engine intake 223 and an engine exhaust 225. The engine intake 223 includes a throttle 262 fluidly coupled to the engine intake manifold 244 via an intake passage 242. The engine exhaust 225 includes an exhaust manifold 248 leading to an exhaust passage 235 that routes exhaust gas to the atmosphere. The engine exhaust 225 may include one or more emission control devices 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 210, such as the example injector 266 shown. While only a single injector 266 is shown, additional injectors are provided for each cylinder. It will be appreciated that fuel system 218 may be a return-less fuel system, a return fuel system, or various other types of fuel system.

Vapors generated in fuel system 218 may be routed to an evaporative emissions control system 251 which includes a fuel vapor canister 222 via vapor recovery line 231, before being purged to the engine intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275. Further, in some examples, one or more fuel tank isolation valves may be included in recovery line 231 or in conduits 271, 273, or 275. Among other functions, fuel tank isolation valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283, and/or conduit 231 may include an isolation valve 253. Further, in some examples, recovery line 231 may be coupled to a fuel filler system 219. In some examples, fuel filler system may include a fuel cap 205 for sealing off the fuel filler system from the atmosphere. However, in other examples, fuel filler system 219 may be a capless fuel filler system. Refueling system 219 is coupled to fuel tank 220 via a fuel filler pipe or neck 211.

A fuel tank pressure transducer (FTPT) 291, or fuel tank pressure sensor, may be included between the fuel tank 220 and fuel vapor canister 222, to provide an estimate of a fuel tank pressure. As described below, in some examples, during engine off conditions sensor 291 may be used to monitor changes in pressure in the fuel system to determine if a leak is present. The fuel tank pressure transducer may alternately be located in vapor recovery line 231, purge line 228, vent line 227, or other location within emission control system 251 without affecting its engine-off leak detection ability.

Emissions control system 251 may include one or more emissions control devices, such as one or more fuel vapor canisters 222 filled with an appropriate adsorbent, the canisters are configured to temporarily trap fuel vapors (including vaporized hydrocarbons) during fuel tank refilling operations and "running loss" (that is, fuel vaporized during vehicle operation). In one example, the adsorbent used is activated charcoal. Emissions control system 251 may further include a canister ventilation path or vent line 227 which may route gases out of the canister 222 to the atmosphere when storing, or trapping, fuel vapors from fuel system 218.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake 244 is provided to the fuel vapor canister for purging. In some examples, vent line 227 may include an air filter 259 disposed therein upstream of a vent valve system 229.

Flow of air and vapors between canister 222 and the atmosphere may be regulated by vent valve system 229. Vent valve system 229 may include a first canister vent valve CV1 and a second canister vent valve CV2 arranged in parallel with one another and positioned in a fuel vapor canister vent path, e.g., in vent line 227. For example, vent valve system 229 may include a first conduit 255 including first vent valve CV1 and a second conduit 257 including second vent valve CV2. In this example, first conduit 255 is arranged in parallel to second conduit 257 in vent line 227. Both first valve CV1 and second valve CV2 may be passive valves which are configured to actuate in the absence of any holding current or other power source. For example, both valves CV1 and CV2 may be normally closed valves which are configured to open without consuming any energy or power from the vehicle system. For example, both valves CV1 and CV2 may be mechanical relief valves with a mechanical bias towards a closed position but may be configured to open in response to a flow of gas at the valve greater than a threshold amount. Further, both valves CV1 and CV2 may be unidirectional valves which permit flow of gas therethrough in substantially only one direction. For example valve CV1 may be a unidirectional valve which permits flow substantially only in a direction from the atmosphere or from filter 259 toward canister 222 and valve CV2 may be a unidirectional valve which permits flow substantially only in a direction from canister 222 towards the atmosphere or towards filter 259.

As remarked above, both valves CV1 and CV2 may be normally closed valves which may be mechanically biased to remain substantially closed until changes in pressure in the fuel system reach or exceed threshold values. For example, valve CV1 may be configured to open in response to an amount of vacuum in the fuel system reaching a vacuum threshold or vacuum set-point. For example, as described below, as ambient temperature decreases in the fuel tank, pressure in the fuel tank may decrease leading to an increase in vacuum in the fuel system. When this increasing vacuum reaches a vacuum threshold or set-point then valve CV1 may be configured to mechanically open without using any actuating power source. As another example, the first mechanical relief valve CV1 may be configured to open in response to a fuel vapor purging event. For example, in response to an initiation of a purge event, an increased vacuum may be present in conduit 228 which may be provided by intake manifold 244, increased vacuum in the fuel tank, or some other vacuum source. This increased vacuum will cause valve CV1 to open so that air may be drawn from the atmosphere into the fuel vapor canister during purging.

Valve CV2 may be configured to open in response to an amount of pressure in the fuel system reaching a pressure threshold or pressure set-point. For example, as described below, as ambient temperature increases in the fuel tank, pressure in the fuel tank may increase in the fuel system. When this increasing pressure reaches a pressure threshold or set-point then valve CV2 may be configured to mechanically open without using any actuating power source. As another example, the second mechanical relief valve CV2 may be configured to open in response to a refueling event. For example, an increased pressure may be present in conduit 228 which may cause valve CV2 to open so that pressure in the fuel system is relieved prior to a refueling event, e.g., before a vehicle operator removes a fuel cap and begins to replenish fuel in the fuel tank.

Further, as described in more detail below, since both valves CV1 and CV2 are configured to be normally closed, the valves may substantially seal off the fuel system so that pressure and vacuum are held via the first and second mechanical relief valves positioned in parallel with one another and without a valve holding current. While the fuel system is sealed, changes in vacuum and pressure in the fuel system may be monitored, e.g., via FTPT 291, to determine if leaks are present in the system.

The vehicle system 206 may further include a control system 214. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device, temperature sensor 233, pressure sensor 237, and pressure sensor 291. Other sensors such as pressure, temperature, air/fuel ratio, and composition sensors may be coupled to various locations in the vehicle system 206. As another example, the actuators may include fuel injector 266, throttle 262, and valve 261. The control system 214 may include a controller 212. The controller may receive input data from the various sensors, process the input data, and trigger the actuators in response to the processed input data based on instruction or code programmed therein corresponding to one or more routines. Example control routines are described herein with regard to FIG. 3.

Emissions control system 251 operates to store vaporized hydrocarbons (HCs) from fuel system 218. Under some operating conditions, such as during refueling, fuel vapors present in the fuel tank may be displaced when liquid is added to the tank. The displaced air and/or fuel vapors may be routed from the fuel tank 220 to the fuel vapor canister 222. If this displaced air increases above a threshold amount or set-point, then valve CV2 may open to direct the displaced air to the atmosphere through vent line 227. In this way, an increased amount of vaporized HCs may be stored in canister 222. During a later engine operation, in some examples, the stored vapors may be released back into the incoming air charge using the intake manifold vacuum. Specifically, in response to an increased vacuum, valve CV1 may open and the canister 222 may draw fresh air through vent line 227 and purge stored HCs into the engine intake for combustion in the engine. As another example, during engine-off conditions when ambient temperatures are decreasing, vacuum in the fuel tank may increase. If this vacuum in the fuel tank increases to a vacuum set-point then valve CV1 may open so that air is drawn through the fuel vapor canister and fuel vapor is purged from the canister and delivered back into the fuel tank.

FIG. 3 shows an example method 300 for operating a vehicle with an engine to generating engine off vacuum or pressure in a fuel system for leak diagnostics. For example, during engine off conditions the naturally occurring diurnal cycle may be used during select times to generate pressure and vacuum changes in the fuel system sealed by mechanical relief valves, e.g., valves CV1 and CV2 described above. These pressure and vacuum changes may be monitored to determine if leaks are present in the fuel system.

By way of example, FIG. 4 shows an example diurnal cycle as a graph of temperature versus time. As illustrated in the example diurnal cycle in FIG. 4, ambient temperatures naturally increase during the day and decrease at night leading to corresponding temperature fluctuations in the fuel system. For example, as shown in FIG. 4 between approximately 7:00 PM to 5:00 AM ambient temperatures are decreasing leading to a decrease in temperatures in the fuel system and a corresponding increase in vacuum present in the fuel system when sealed from the atmosphere. However, between approximately 5:00 AM and 7:00 PM ambient temperatures are increasing leading to an increase in temperatures in the fuel system and a corresponding increase in pressure present in the fuel system when sealed from the atmosphere. As described below, pressure changes in the fuel system due to these naturally occurring temperature changes may be used during engine off conditions when the fuel system is sealed off from the atmosphere by normally closed parallel valves CV1 and CV2 to monitor for leaks.

Turning to method 300, at 302, method 300 includes determining if entry conditions are met. Entry conditions may include engine off conditions when an engine of the vehicle is not in operation. For example, the vehicle may be a hybrid electric vehicle operating in an engine off mode and being powered by batteries in the vehicle. As another example, entry conditions may include a key-off event wherein the vehicle is turned off, e.g., where the vehicle is parked or is not in use and the engine is not running Entry conditions may be further based on temperatures in the fuel system or evaporative emission control system, e.g., entry conditions during engine-off conditions may be based on a temperature in the fuel system less than a threshold temperature or greater than a threshold temperature. For example, entry conditions may include determining if a temperature in the fuel system is in a predetermined range of temperatures. For example, if the temperatures are below a lower temperature threshold or above an upper temperature threshold then method 300 may end.

If entry conditions are met at 302, method 300 proceeds to 304. At 304, method 300 includes determining if increasing temperature conditions are present. For example, at 304, method 300 may include determining if ambient temperatures or temperatures in the fuel system are increasing at a rate greater than a threshold temperature increase rate. For example, as shown in the example diurnal cycle in FIG. 4, though temperatures are increasing between approximately 5:00 AM to 7:00 PM, the rate of the temperature increase during that time may vary. Thus, in some examples, leak testing may not be initiated until a rate of temperature increase is greater than a rate threshold. However, in other examples, any increasing temperature conditions while the engine is off may initiate leak testing.

If increasing temperature conditions are present at 304, method 300 proceeds to 306. At 306, method 300 includes monitoring the evaporative emissions control system for leaks. For example, controller 212 may monitor pressure increases due to the increasing temperature conditions via sensor 291 to determine whether or not a leak is present in the sealed fuel system during engine off conditions. In some examples, controller 212 may remain in a monitoring state throughout engine off conditions to monitor for leaks. However, in other examples, in order to conserve power, controller 212 may be powered off during engine off conditions but may "wake-up" or power on in response to increasing temperature conditions in order to monitor for leaks.

Leaks may be diagnosed based pressure changes in the sealed fuel system during engine off conditions. For example, leaks may be indicated based on comparisons of measured pressure changes in the system as compared with expected and/or predicted pressure changes in the system. For example, in response to an increasing ambient temperature, a leak may be indicated in the fuel system in response to a pressure increase in the fuel system less than a threshold. That is, leaks in the fuel system may be indicated based on a change in pressure in the fuel system, where the pressure in the fuel system is held via the second mechanical relief valve CV2 without a valve holding current. FIG. 5 shows example fuel tank pressure changes versus time during an increasing temperature condition for a fuel system without a leak, labeled "No Leak", and a fuel system with a leak, labeled "Leak." For example, at time 502 in FIG. 5, leak monitoring may be initiated and sensor 291 may record pressure changes in the fuel tank during the increasing temperature conditions. The curve in FIG. 5 labeled "No Leak" may be used as an expected tank pressure change corresponding to the increasing temperature. In other examples, a suitable model, such as the ideal gas law (PV=nRT) may be used to approximate an expected pressure change during the increasing temperature condition. If a leak is present, as illustrated by the curve labeled "Leak" in FIG. 5, the increase in fuel tank pressure may be less than expected or predicted indicating that a leak is present. In any case, once the tank pressure reaches a pressure set point 506, valve CV2 will open to relieve the pressure as described below.

At 308, method 300 includes determining if pressure in the fuel system reaches a pressure set-point. For example, as described above, valve CV2 may be configured to open in response to an amount of pressure in the fuel system reaching a pressure threshold or pressure set-point. If pressure in the fuel system reaches the pressure set-point at 308, method 300 proceeds to 310. At 310, method 300 includes relieving pressure in the fuel system. For example, the second mechanical relief valve CV2 may open in order to relieve the pressure build in the system as shown at time 504 in FIG. 5 for example. As remarked above, valve CV2 may be configured to mechanically open without using any actuating power source. As another example, the second mechanical relief valve CV2 may be configured to open in response to a refueling event. For example, an increased pressure may be present in conduit 228 which may cause valve CV2 to open so that pressure in the fuel system is relieved prior to a refueling event, e.g., before a vehicle operator removes a fuel cap and begins to replenish fuel in the fuel tank.

After relieving pressure in the system or if pressure does not reach the pressure set-point at 308, method proceeds to 312. At 312, method 300 includes determining if a leak was detected. For example, as described above with reference to FIG. 5, measured pressure changes in the isolated fuel system during increasing temperature conditions may be compared to predicted or expected pressure changes. If the amount of pressure increase is less than a threshold then a leak may be present.

If a leak was detected at 312 then method 300 proceeds to 314. At 314, method 300 includes indicating a leak. For example, in response to a leak detected while generating engine off vacuum or pressure in the fuel system, degradation of the fuel system may be indicated. For example indicating a leak may include setting a diagnostic code, sending a notification to an onboard diagnostic computing device, sending a message to a vehicle operator via a message center to alert the vehicle operator of a leak present, etc.

At 316, method 300 may include performing mitigating actions. For example, engine operating conditions may be adjusted in response to a leak detected. For example, one or more fuel tank isolation valves may be employed to further diagnose a location of the leak or additional venting may be provided to the fuel system in order to reduce pressure in the fuel system.

Returning to 304 in method 300, if at 304, an increasing temperature condition is not present, then method 300 proceeds to 318. At 318, method 300 includes determining if decreasing temperature conditions are present. For example, at 318, method 300 may include determining if ambient temperatures or temperatures in the fuel system are decreasing at a rate greater than a threshold temperature decrease rate. For example, as shown in the example diurnal cycle in FIG. 4, though temperatures are decreasing between approximately 7:00 PM to 5:00 AM, the rate of the temperature decrease during that time may vary. Thus, in some examples, leak testing may not be initiated until a rate of temperature decrease is greater than a decrease rate threshold. However, in other examples, any decreasing temperature conditions while the engine is off may initiate leak testing.

If decreasing temperature conditions are present at 318, method 300 proceeds to 320. At 320, method 300 includes monitoring the evaporative emissions control system for leaks. For example, controller 212 may monitor vacuum increases due to the decreasing temperature conditions via sensor 291 to determine whether or not a leak is present in the sealed fuel system during engine off conditions. As remarked above, in some examples, controller 212 may remain in a monitoring state throughout engine off conditions to monitor for leaks. However, in other examples, in order to conserve power, controller 212 may be powered off during engine off conditions but may "wake-up" or power on in response to decreasing temperature conditions in order to monitor for leaks.

Leaks may be diagnosed based vacuum changes in the sealed fuel system during engine off conditions. For example, leaks may be indicated based on comparisons of measured vacuum changes in the system as compared with expected and/or predicted vacuum changes in the system. For example, in response to a decreasing ambient temperature, a leak may be indicated in the fuel system in response to a vacuum increase in the fuel system less than a threshold. That is, leaks in the fuel system may be indicated based on a change in vacuum in the fuel system, where the vacuum in the fuel system is held via the first mechanical relief valve CV1 without a valve holding current. FIG. 6 shows example fuel tank pressure changes versus time during a decreasing temperature condition for a fuel system without a leak, labeled "No Leak", and a fuel system with a leak, labeled "Leak." For example, at time 602 in FIG. 6, leak monitoring may be initiated and sensor 291 may record pressure changes in the fuel tank during the decreasing temperature conditions. The curve in FIG. 6 labeled "No Leak" may be used as an expected tank vacuum change corresponding to the decreasing temperature. In other examples, a suitable model, such as the ideal gas law (PV=nRT) may be used to approximate an expected vacuum change during the decreasing temperature condition. If a leak is present, as illustrated by the curve labeled "Leak" in FIG. 6, the increase in fuel tank vacuum may be less than expected or predicted indicating that a leak is present. In any case, once the tank vacuum reaches a vacuum set point 606, valve CV1 will open to relieve the vacuum as described below.

At 322, method 300 includes determining if vacuum in the fuel system reaches a vacuum set-point. For example, as described above, valve CV1 may be configured to open in response to an amount of vacuum in the fuel system reaching a vacuum threshold or vacuum set-point. If vacuum in the fuel system reaches the vacuum set-point at 322, method 300 proceeds to 324. At 324, method 300 includes relieving vacuum in the fuel system. For example, the first mechanical relief valve CV1 may open in order to relieve the vacuum build in the system as shown at time 604 in FIG. 6 for example. As remarked above, valve CV1 may be configured to mechanically open without using any actuating power source. As another example, the first mechanical relief valve CV1 may be configured to open in response to a fuel vapor purging event. For example, an increased vacuum may be present in conduit 228 which may cause valve CV1 to open so that vacuum in the fuel system pulls air from the atmosphere into the fuel vapor canister to purge fuel vapors stored in the canister.

After relieving vacuum in the system or if vacuum does not reach the vacuum set-point at 322, then method proceeds to 312. At 312, method 300 includes determining if a leak was detected. For example, as described above with reference to FIG. 6, measured vacuum changes in the isolated fuel system during decreasing temperature conditions may be compared to predicted or expected vacuum changes. If the amount of vacuum increase is less than a threshold then a leak may be present. As remarked above, if a leak was detected at 312 then method 300 proceeds to 314 to indicate a leak. Further, at 316, mitigating actions may be performed in response to an indication of a leak.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle with an engine, comprising:

with a temperature sensor, measuring ambient temperature;

generating engine off pressure in a fuel system for leak diagnostics, the pressure held via first and second mechanical relief valves and without a valve holding current, the relief valves positioned in parallel in a vent line, outside of a fuel tank, between a fuel vapor canister and a vent to the atmosphere, the canister also positioned outside of the fuel tank;

in response to the measured ambient temperature increasing at a rate greater than a threshold temperature increase rate during the generation of the engine off pressure, initiating leak testing, indicating a leak in the fuel system in response to a pressure increase in the fuel system less than a threshold, and indicating no leak in the fuel system in response to a pressure increase in the fuel system greater than the threshold; and generating engine off vacuum in the fuel system, the vacuum held via the first and second mechanical relief valves and without a valve holding current;

in response to the measured ambient temperature decreasing at a rate greater than a threshold temperature decrease rate during the generation of the engine off vacuum, initiating leak testing, indicating a leak in the fuel system in response to a vacuum increase in the fuel system less than a threshold, and indicating no leak in the fuel system in response to a vacuum increase in the fuel system greater than the threshold.

2. The method of claim 1, wherein the first mechanical relief valve is configured to open in response to an amount of vacuum in the fuel system reaching a vacuum set point and the second mechanical relief valve is configured to open in response to an amount of pressure in the fuel system reaching a pressure set point.

3. The method of claim 1, wherein the second mechanical relief valve is configured to open in response to a refueling event.

4. The method of claim 1, wherein the first mechanical relief valve is configured to open in response to a fuel vapor purging event.

5. The method of claim 1, wherein the vehicle is a hybrid electric vehicle.

6. The method of claim 1, further comprising, in response to an indication of a leak in the fuel system, indicating a degradation of the fuel system and performing mitigating actions.

7. A method for a vehicle with an engine, comprising:

during an engine off condition, measuring ambient temperature with a temperature sensor;

in response to the measured ambient temperature increasing at a rate of change with respect to time greater than a threshold temperature increase rate during the engine off condition, initiating leak testing, and indicating a leak in a fuel system of the vehicle based on a comparison of a change in pressure in the fuel system to a threshold change in pressure in the fuel system, where the pressure in the fuel system is held via a first mechanical relief valve without a valve holding current;

in response to the measured ambient temperature increasing at a rate of change with respect to time less than the threshold temperature increase rate during the engine off condition, not initiating leak testing;

in response to the measured ambient temperature decreasing at a rate of change with respect to time greater than a threshold temperature decrease rate during the engine off condition, initiating leak testing, and indicating a leak in the fuel system of the vehicle based on a comparison of a change in vacuum in the fuel system to a threshold change in vacuum in the fuel system, where the vacuum in the fuel system is held via a second mechanical relief valve without a valve holding current, where the first and second mechanical relief valves are positioned in parallel with one another in a fuel vapor canister vent path between a fuel vapor canister and a vent to the atmosphere, the fuel vapor canister and the first and second mechanical relief valves positioned outside of a fuel tank; and in response to the measured ambient temperature decreasing at a rate of change with respect to time less than the threshold temperature decrease rate during the engine off condition, not initiating leak testing.

8. The method of claim 7, wherein the first mechanical relief valve is configured to open in response to an amount of vacuum in the fuel system reaching a vacuum set point and the second mechanical relief valve is configured to open in response to an amount of pressure in the fuel system reaching a pressure set point.

9. The method of claim 7, wherein the comparison of the change in pressure in the fuel system to the threshold change in pressure in the fuel system comprises a comparison of a pressure increase in the fuel system to a threshold pressure increase in the fuel system, the method further comprising, during the leak testing initiated in response to the measured ambient temperature increasing at a rate of change with respect to time greater than the threshold temperature increase rate during the engine off condition, in response to the pressure increase being less than the threshold pressure increase, indicating a leak in the fuel system; and in response to the pressure increase being greater than the threshold pressure increase, not indicating a leak in the fuel system.

10. The method of claim 7, wherein the comparison of the change in vacuum in the fuel system to the threshold change in vacuum in the fuel system comprises a comparison of a vacuum increase in the fuel system to a threshold vacuum increase in the fuel system, the method further comprising, during the leak testing initiated in response to the measured ambient temperature decreasing at a rate of change with respect to time greater than the threshold temperature decrease rate during the engine off condition, in response to the vacuum increase being less than the threshold vacuum increase, indicating a leak in the fuel system; and in response to the vacuum increase being greater the threshold vacuum increase, not indicating a leak in the fuel system.

11. The method of claim 7, wherein the second mechanical relief valve is configured to open in response to a refueling event.

12. The method of claim 7, wherein the first mechanical relief valve is configured to open in response to a fuel vapor purging event.

13. The method of claim 7, wherein the vehicle is a hybrid electric vehicle.

14. A vehicle system, comprising:

a fuel system including a fuel tank, and a fuel vapor canister arranged outside of the fuel tank;

first and second mechanical relief valves positioned in parallel with one another outside of the fuel tank in a vent path of the fuel vapor canister between the fuel vapor canister and a vent to atmosphere;

a temperature sensor arranged in an engine exhaust passage and configured to measure ambient temperature; and a controller configured to, during an engine off condition:

during increasing ambient temperature conditions occurring during a diurnal temperature cycle, determine whether the measured ambient temperature is increasing at a rate of change, with respect to time of day, greater than a threshold temperature increase rate;

in response to the measured ambient temperature increasing at a rate of change, with respect to time of day, greater than the threshold temperature increase rate, initiate leak testing and indicate a leak in the fuel system of the vehicle based on a change in pressure in the fuel system, where the pressure in the fuel system is held via the first mechanical relief valve without a valve holding current;

in response to the measured ambient temperature increasing at a rate of change, with respect to time of day, less than the threshold temperature increase rate, not initiate leak testing;

during decreasing ambient temperature conditions occurring during the diurnal temperature cycle, determine whether the measured ambient temperature is decreasing at a rate of change, with respect to time of day, greater than a threshold temperature decrease rate;

in response to the measured ambient temperature decreasing at a rate of change, with respect to time of day, greater than the threshold temperature decrease rate, initiate leak testing and indicate a leak in the fuel system of the vehicle based on a change in vacuum in the fuel system, where the vacuum in the fuel system is held via the second mechanical relief valve without a valve holding current; and in response to the measured ambient temperature decreasing at a rate of change, with respect to time of day, less than the threshold temperature decrease rate, not initiate leak testing.

15. The system of claim 14, wherein the vehicle is a hybrid electric vehicle.

16. The system of claim 14, wherein the first mechanical relief valve is configured to open in response to an amount of vacuum in the fuel system reaching a vacuum threshold and the second mechanical relief valve is configured to open in response to an amount of pressure in the fuel system reaching a pressure threshold.

17. The system of claim 14, wherein the second mechanical relief valve is configured to open in response to a refueling event and wherein the first mechanical relief valve is configured to open in response to a fuel vapor purging event.

* * * * *